(12) United States Patent
Luepfert et al.

(10) Patent No.: US 7,827,902 B2
(45) Date of Patent: Nov. 9, 2010

(54) PISTON FOR A RECIPROCATING-PISTON INTERNAL COMBUSTION ENGINE PROVIDED WITH HARDENED PISTON RING GROOVES

(75) Inventors: Anja Luepfert, Gundelsdorf (DE); Stefan Knobloch, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 432 days.

(21) Appl. No.: 11/886,602

(22) PCT Filed: Mar. 14, 2006

(86) PCT No.: PCT/EP2006/002293

§ 371 (c)(1),
(2), (4) Date: Jan. 7, 2008

(87) PCT Pub. No.: WO2006/097265

PCT Pub. Date: Sep. 21, 2006

(65) Prior Publication Data

US 2009/0013865 A1     Jan. 15, 2009

(30) Foreign Application Priority Data

Mar. 18, 2005   (DE) .................. 10 2005 013 087

(51) Int. Cl.
*F16J 1/04*        (2006.01)
(52) U.S. Cl. .......................... 92/223; 92/222
(58) Field of Classification Search ............ 92/208, 92/222, 223; 29/888.048, 888.049
See application file for complete search history.

(56) References Cited

U.S. PATENT DOCUMENTS

| | | | | |
|---|---|---|---|---|
| 4,899,702 A | * | 2/1990 | Sasaki et al. | 92/222 |
| 5,158,052 A | * | 10/1992 | Yoshimura | 92/223 |
| 2003/0150419 A1 | | 8/2003 | Daraghen et al. | |

FOREIGN PATENT DOCUMENTS

| | | |
|---|---|---|
| DE | 198 33 825 | 12/1999 |
| DE | 102 21 800 | 12/2003 |

OTHER PUBLICATIONS

Search Report dated Jul. 3, 2006 for the underlying International Application No. PCT/EP2006/002293.

* cited by examiner

*Primary Examiner*—Michael Leslie
(74) *Attorney, Agent, or Firm*—Cohen Pontani Lieberman & Pavane LLP

(57) ABSTRACT

A piston made of a nitride-forming base alloy for a reciprocating internal combustion engine is disclosed. The piston includes a piston upper part having a plurality of peripheral piston ring grooves, each piston ring groove having two groove flanks, one of the piston ring grooves being closest to a combustion chamber of the internal combustion engine than the remaining piston ring grooves, the groove flanks of at least the one of the piston ring grooves being hardened using a boundary layer, the piston upper part including an external surface which includes the hardened groove flanks, and a wear and correction protection layer coating at least the external surface, the wear and correction protection layer includes a nitration layer. The nitration layer is generated by converting the nitride-forming base alloy by one of plasma nitration and plasma nitro-carburization in at least one of a nitrogen atmosphere and a nitrogen-carbon atmosphere.

3 Claims, 1 Drawing Sheet

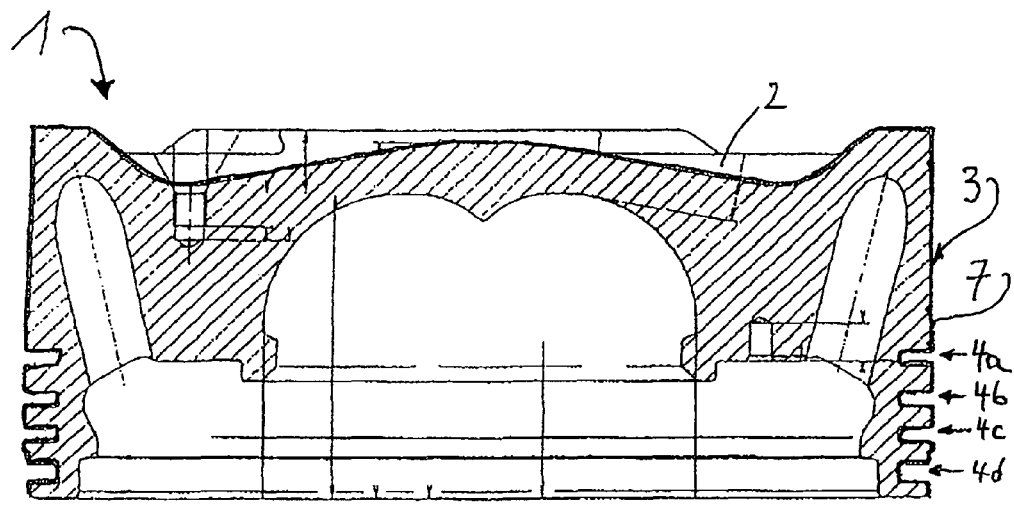
Fig. 1
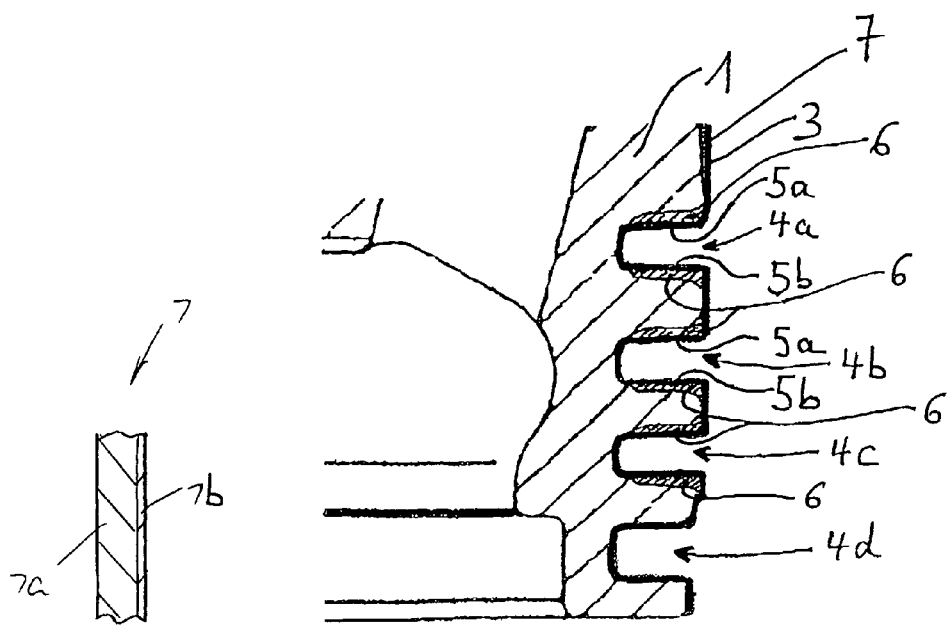
Fig. 3
Fig. 2

PISTON FOR A RECIPROCATING-PISTON INTERNAL COMBUSTION ENGINE PROVIDED WITH HARDENED PISTON RING GROOVES

CROSS-REFERENCE TO RELATED APPLICATIONS

This is a U.S. national stage of International Application No. PCT/EP2006/002293, filed on 14 Mar. 2006. Priority is claimed on German Application No. 10 2005 013 087.9, filed on 18 Mar. 2005.

BACKGROUND OF THE INVENTION

1. Field of the Invention

The present invention relates to a piston for a reciprocating internal combustion engine, made of a nitride-forming base alloy and having a piston upper part, which is implemented having multiple peripheral piston ring grooves and a head land, and at least whose uppermost ring groove in proximity to the combustion chamber has hardened groove flanks protected against wear.

2. Description of the Related Art

The piston upper part, which represents the uppermost element diametrically opposite the combustion chamber and which passes through the entire combustion sequence, forms the most endangered part of a piston according to the species.

The seal against the combustion pressure acting from above on the piston upper part plays a special role here. This is produced by so-called piston rings, which are seated in the lateral part of the piston in piston ring grooves and which seal the combustion chamber toward the bottom in relation to the crankcase. A large problem in this area is the service life of the piston ring grooves. This determines the maintenance intervals and thus the operating costs and operational reliability of the entire piston very decisively.

These piston upper parts and in particular their piston ring grooves are known to be hardened to lengthen the operational lifetime, either inductively and/or by chroming. Inductive hardening results in moderate wear behavior. For example, DE 198 33 825 C1 has already disclosed a piston as described above, in particular for a large engine, in which the piston ring grooves have flanks protected against wear.

The piston upper part comprises tempered and alloyed steel here, which is hardened in the area of the upper and lower flanks of the piston ring grooves in such a way that continuous hardened zones result over the supporting area of the flank width. The hardening procedure may expediently be performed inductively, which permits the required temperature control to produce the desired microstructure conversion in a simple way.

However, this measure is no longer adequate beyond a specific level of the ignition pressure. The flank load increases disproportionately with increasing ignition pressure. The currently desired low lubrication rates are also unfavorable in this context. Therefore, rapid wear of the hardened flanks occurs. This is true in particular for the first piston ring groove lying closest to the combustion chamber, where experience has shown the load is greatest.

On the other hand, it is also already known that the wear resistance is significantly increased in nitrated or nitro-carburized steels.

In general, plasma nitration or plasma nitro-carburization is understood as hardening of the surface layers of steels, nitrogen and/or carbon atoms diffusing in and reacting in a thin surface layer with iron to form nitrides or carbon nitrides, the bonding layer. In the adjoining diffusion layer, the nitrogen is first partially precipitated as a nitride upon cooling and then causes the hardness increase. The hardness itself is a function of the type of the nitrides. Nitration times and layers differ depending on how the nitrogen is caused to react with the steel.

In other words, there is diffusion saturation of the boundary layer of a material with nitrogen to increase hardness, wear resistance, fatigue strength, or corrosion resistance. The boundary layer comprises an external nitride and/or carbon nitride layer (bonding layer) and an adjoining layer made of mixed crystals enriched with nitrogen and precipitated nitrides (diffusion layer) after the nitration/nitro-carburization.

The nitration times may be shortened by ionization of the nitrogen by glow discharge, so-called plasma nitration (plasma nitration at 450° C. to 550° C.).

In nitro-carburization, in which the treatment agent also contains components discharging carbon in addition to nitrogen, nitro-carburization may be performed in powder, salt bath, gas, or plasma (plasma nitro-carburization at 500° C. to 590° C., preferably at approximately 520° C.).

SUMMARY OF THE INVENTION

The present invention is therefore based on an object of optimizing a piston according to the species having ring groove flanks already hardened using a boundary layer and made of a tempered and nitride-forming alloyed steel in such a way that the piston upper part, but in particular its uppermost piston ring grooves, have a further lengthened operational lifetime, i.e., in particular the ring groove wear on the piston upper part is further reduced.

Because at least the external faces of the piston upper part, which comprise the groove flanks hardened against wear, are provided with a further wear and corrosion protection layer in the form of a nitration layer, the wear and corrosion protection layer being generated by converting the nitride-forming base alloy by plasma nitration or plasma nitro-carburization in a nitrogen or nitrogen-carbon atmosphere, so that the hardened groove flanks are additionally protected using a nitration layer, significantly improved wear and corrosion protection and, of course, longer maintenance intervals/component lifetimes are achieved. In particular in the first ring groove, which is stressed most strongly and lies closest to the combustion chamber, the wear may thus be greatly minimized.

BRIEF DESCRIPTION OF THE DRAWINGS

The piston according to the present invention is illustrated on the basis of an exemplary embodiment in the drawing and is explained in greater detail in the following.

FIG. 1 shows a longitudinal section through a piston upper part implemented according to the present invention;

FIG. 2 shows a detail view from FIG. 1 in regard to the three upper ring grooves, which are hardened on the flanks and additionally provided with a nitration layer according to the present invention; and FIG. 3 is an enlarged cross section view of the nitration layer.

DETAILED DESCRIPTION OF THE PREFERRED EMBODIMENTS

FIG. 1 shows a piston upper part (1) of a piston of a reciprocating internal combustion engine having a combustion bowl (2), a head land (3), and four ring grooves (4a, b, c, d), each having parallel ring groove flanks (5a, b).

This piston upper part (1) comprises an annealed and nitride-forming alloy steel. According to FIG. 2, the three upper ring grooves (4a, b, c) are each hardened in the area of their upper and lower flanks (5a, b) in such a way that continuous hardening zones in the form of a boundary layer (6) result over the supporting area of the flank width. The hardening procedure itself has been performed inductively in a way known per se here.

Furthermore, according to FIG. 1 and FIG. 2, at least the external parts of the piston upper part (1), which comprise the ring grooves (4a, b, c) protected against wear and the head land (3), are provided with a further wear and corrosion protection layer (7) in the form of a nitration layer, the wear and corrosion protection layer (7) being generated by converting the nitride-forming base alloy by plasma nitration or plasma nitro-carburization in a nitrogen and/or nitrogen-carbon atmosphere, so that the hardened groove flanks (5a, b) are additionally protected using the nitration layer (7).

It is important in the meaning of the present invention that at least the ring grooves (4a, b, c) protected against wear using the boundary layer (6) are provided with a further nitration layer, combustion bowl (2) and/or head land (3) do not have to be nitrated.

In particular as shown in FIG. 1, according to the present exemplary embodiment, the entire external surface of the piston upper part (1) is provided with the nitration layer (7), while the internal surface of the piston upper part (1) remains uncoated.

The nitration layer (7) is known to form a two-layer construction, namely at least one diffusion layer 7a adjoining the component surface and one bonding layer 7b built up thereon (See FIG. 3). It is to be presented as characteristic for the present invention that the nitration layer (7), including the hardened boundary layer, has a thickness (nitration hardening depth) of 0.2 mm to 1.0 mm on the hardened groove flanks (5a, b), which have a bonding layer built up thereon having a thickness of 2 µm to 15 µm, and provides a surface hardness greater than 550 HV (Vickers).

The hardness of the diffusion zone decreases with increasing thickness and/or distance from the surface, because the effect of the nitration hardening is decreased with depth as a result of these controlling diffusion procedures.

The use according to the present invention of a nitration layer (7) for the external surface, which is impinged by exhaust gas, of a piston upper part (1) of a piston of a reciprocating internal combustion engine not only results in increased wear resistance in the ring groove area, in particular the upper ring grooves and very especially the first ring groove (4a) lying closest to the combustion chamber (2), but rather also causes greater resistance to corrosion.

Finally, it is to be noted that the groove flanks protected against wear are preferably inductively hardened in the first pass.

What is claimed is:

1. A piston for a reciprocating internal combustion engine, the piston comprising:
    a piston upper part made of a nitride-forming base alloy and having a plurality of peripheral piston ring grooves, each piston ring groove having two facing groove flanks, one of the piston ring grooves being closer to a combustion chamber of the internal combustion engine than the remaining piston ring grooves, the groove flanks of at least the one of the piston ring grooves being hardened groove flanks, each of the hardened groove flanks having a boundary layer,
    the piston upper part comprising an external surface which comprises the hardened groove flanks, and a wear and corrosion protection layer coating at least the external surface, the wear and corrosion protection layer comprising a nitration layer,
    wherein the nitration layer is generated by converting the nitride-forming base alloy by one of plasma nitration and plasma nitro-carburization in at least one of a nitrogen atmosphere and a nitrogen-carbon atmosphere, and
    wherein the nitration layer comprises a bonding layer having a thickness of 2 µm to 12 µm, the nitration layer and the boundary layer on the hardened groove flanks collectively having a nitration hardness depth of 0.2 mm to 1.0 mm, and exhibiting a surface hardness greater than 550 HV.

2. The piston of claim 1, wherein the piston upper part further comprises an internal surface, the entire external surface of the piston upper part being coated with the nitration layer while the internal surface of the piston upper part remains uncoated.

3. The piston of claim 1, wherein the groove flanks of at least the one of the piston ring grooves are inductively hardened before being coated with the nitration layer.

* * * * *